United States Patent Office 3,085,197
Patented Apr. 9, 1963

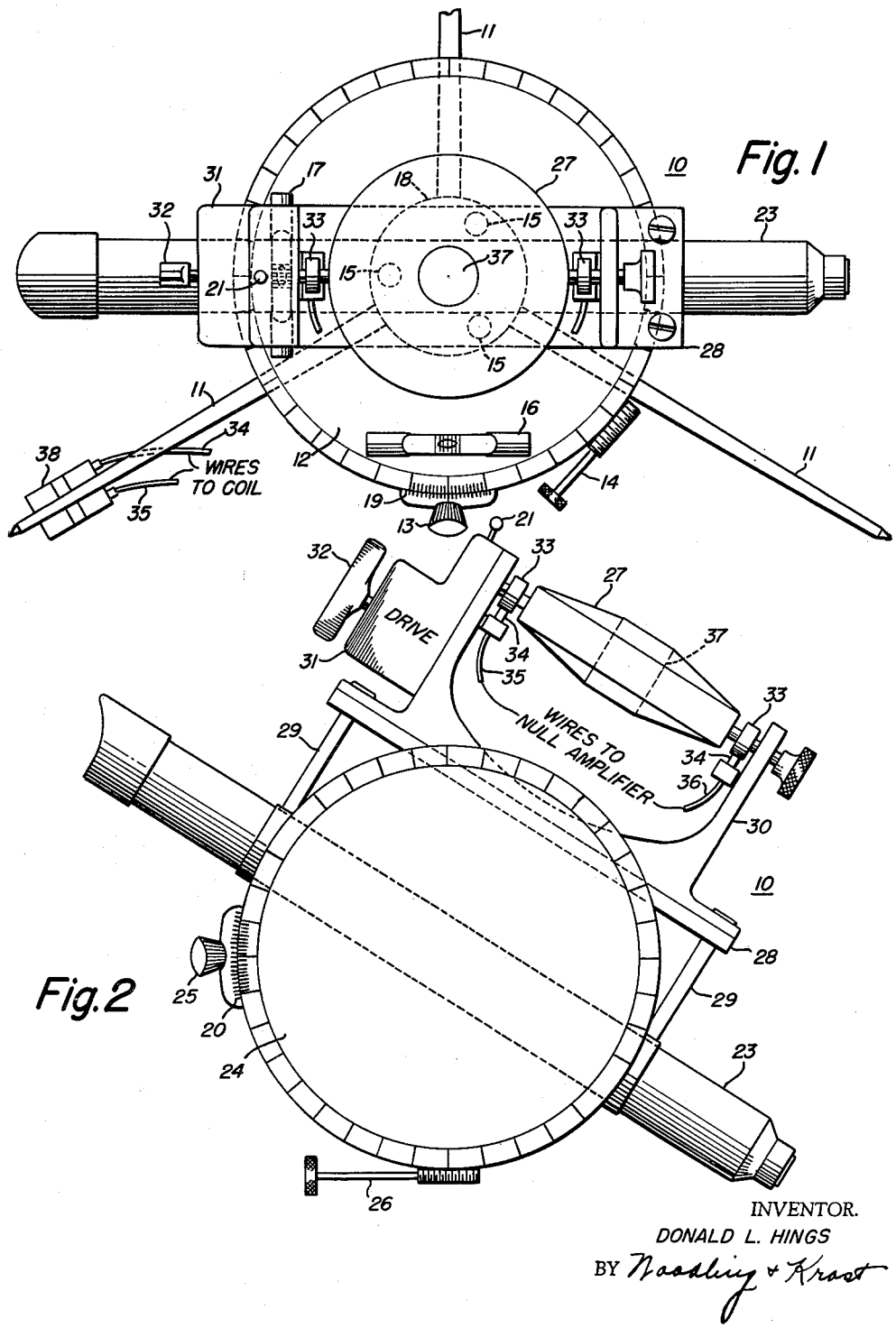
April 9, 1963 D. L. HINGS 3,085,197
INDUCTOR SURVEY APPARATUS AND METHOD FOR DETERMINING
PRESENCE OF OIL BEARING SUBSTRATA
Filed April 28, 1958 4 Sheets-Sheet 1
INVENTOR.
DONALD L. HINGS April 9, 1963                D. L. HINGS                3,085,197
INDUCTOR SURVEY APPARATUS AND METHOD FOR DETERMINING
PRESENCE OF OIL BEARING SUBSTRATA
Filed April 28, 1958                        4 Sheets-Sheet 4
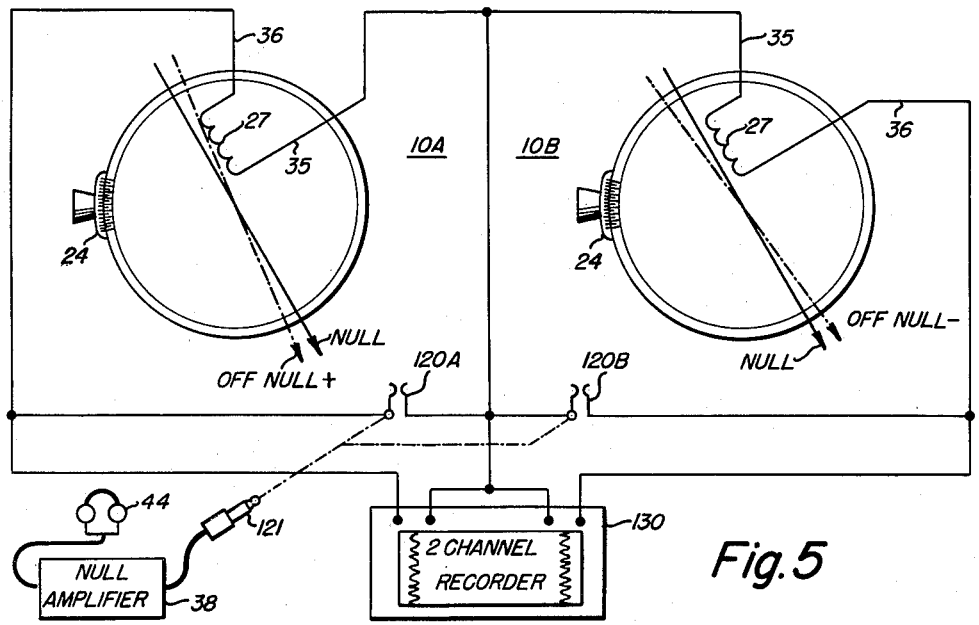
Fig.5
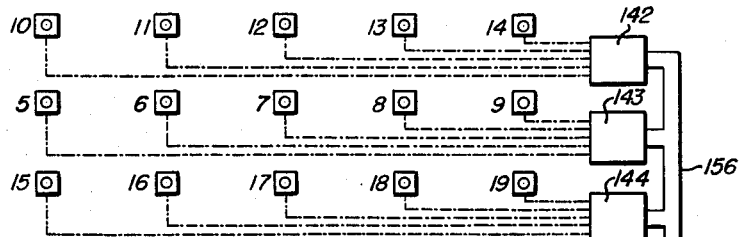
Fig.6
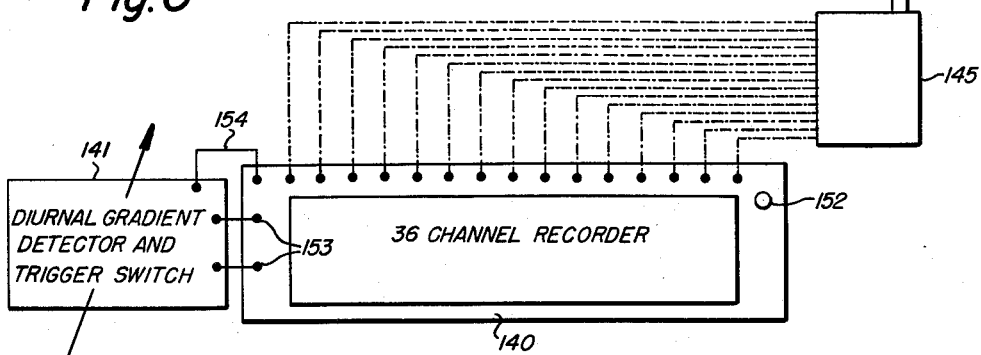
INVENTOR.
DONALD L. HINGS

3,085,197
INDUCTOR SURVEY APPARATUS AND METHOD FOR DETERMINING PRESENCE OF OIL BEARING SUBSTRATA
Donald L. Hings, 281 N. Howard Ave., Vancouver, British Columbia, Canada
Filed Apr. 28, 1958, Ser. No. 731,358
6 Claims. (Cl. 324—8)

The invention relates in general to apparatus and method responsive to earth's magnetic field and to diurnal electromagnetic waves to determine the presence of oil under the earth's surface.

An object of the invention is the provision of apparatus and method for determining the presence of oil under the earth's surface, it being understood, however, the world "oil" is used in a geological sense.

Another object of the invention is the provision of an instrument which is highly sensitive to measurements of the direction of the earth's magnetic field and the change of the diurnal electromagnetic waves which modify the direction of the earth's magnetic field, said measurements being taken at timed intervals on the earth's surface and their differences noted to determine the presence of oil below the earth's surface.

Another object of the invention is the provision of apparatus to determine the presence of oil beneath the earth's surface by a relatively simple and portable device.

Another object of the invention is the provision of an instrument and method for establishing magnetic pattern in relation to time and space for determining the presence of oil beneath the earth's surface.

Another object of the invention is to determine the presence of an oil bearing substrata by a determination of inclination angles establishing an inclination anomaly.

Another object of the invention is a method to determine the presence of an oil bearing substrata which takes into account the influence changes in the intensities of diurnal magnetic intensities have upon a field created by an oil bearing substrata.

Another object of the invention is the provision of apparatus and method to record a plurality of inclination angles at a remote station from which the inclination angles are taken.

Another object of the invention is the provision of a null amplifying circuit having a tolerance of sensitivity which matches the tolerance of sensitivity of a theodolite which is capable of measuring small angles in terms of seconds.

Other objects and a fuller understanding of my invention may be had by referring to the following description and claims, taken in conjunction wtih the accompanying drawing, in which:

FIGURE 1 is a plan view of a theodolite inductor coil showing principally the horizontal plate and vernier of my instrument, with only the essential parts thereof being shown;

FIGURE 2 is a vertical side view of the theodolite inductor coil showing principally the vertical wheel and vernier, the horizontal plate being omitted along with other parts;

FIGURE 5 is a modified form of the apparatus to measure inclination angles; and

FIGURE 6 is a centralized recorder system to measure a plurality of inclination angles.

Figure 3:
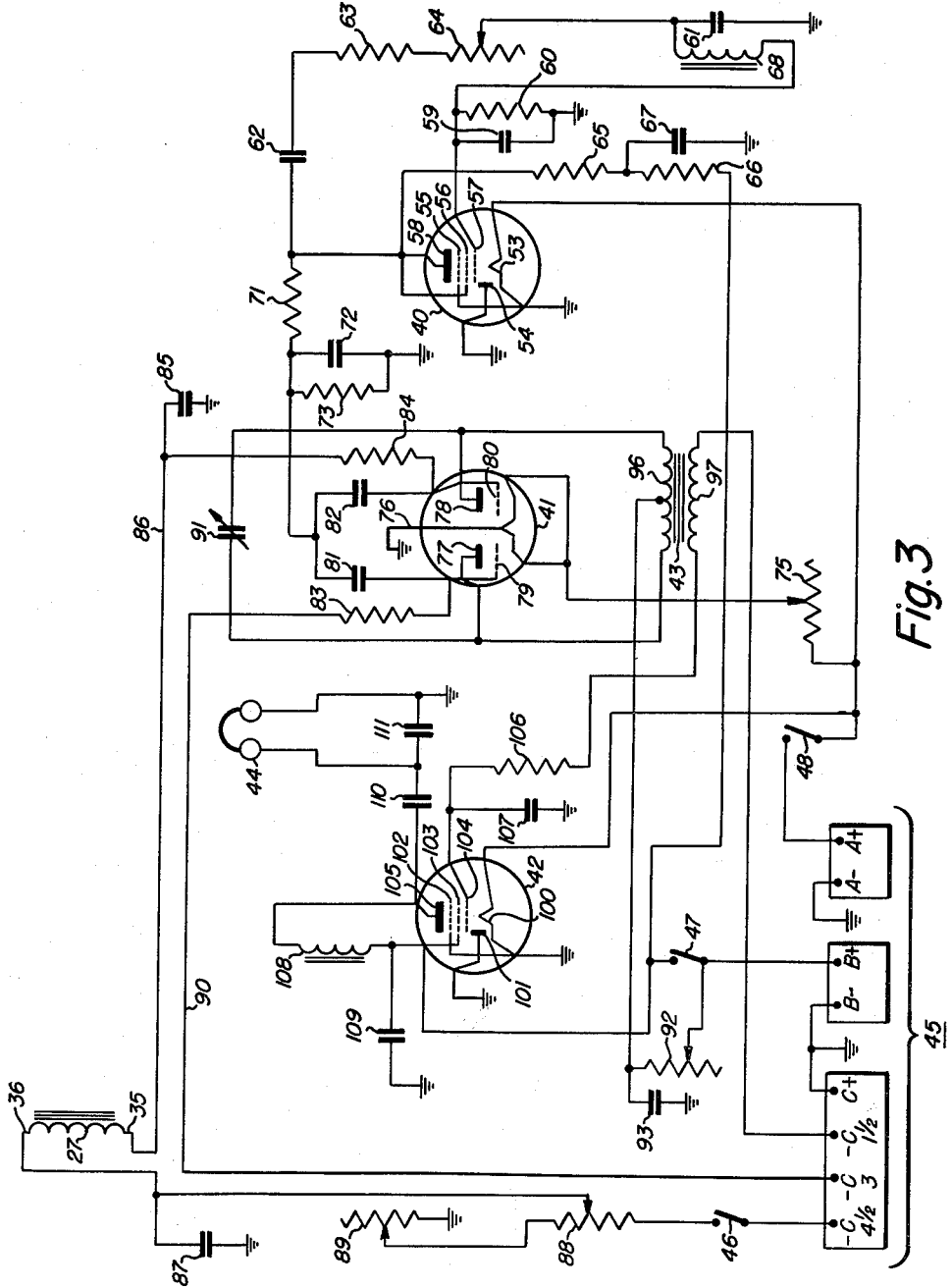
FIGURE 3 is a diagrammatic circuit showing a null amplifier or microvoltmeter electrically connected to the inductor coil of the theodolite instrument.

With reference to FIGURES 1 and 2 of the drawing, my theodolite inductor coil is illustrated generally by the reference character 10. Many parts of the theodolite are not shown but the device actually embodies a theodolite head illustrated by the reference character 18 which is supported by three legs 11.

FIGURE 1 shows principally the horizontal plate 12 having a vernier 19 which may be rotated through an angle of 360 degrees. A magnifying glass 13 is employed to magnify the lines on the vernier so that readings in my device may be accurate to plus-or-minus five seconds in angular measurements. The horizontal vernier 19 may be driven by a horizontal tangent screw drive 14. Mounted on the horizontal plate 12 of the theodolite head 18 are two leveling bubbles 16 and 17. The bubbles 16 and 17 may be leveled by the vertically extending three adjusting screws 15. With this device, the adjusting screws 15 are of the vernier type and the bubbles may be adjusted to a tolerance as low as plus-or-minus five seconds in angular degrees. In other words, the leveling bubbles 16 and 17 have a high degree of sensitivity and match the tolerance of the horizontal vernier scale 19.

FIGURE 2 of the drawings shows only the vertical vernier arrangement 20 on the vertical wheel identified by the reference character 24. The horizontal vernier 19 and other associated parts of the theodolite head 18 are not shown in FIGURE 2. A magnifying glass 25 may be employed to magnify the graduation lines of the vertical vernier 20 so that accurate readings may be observed within a tolerance of plus-or-minus five seconds in angular measurement. The vertical vernier 20 may be driven by a vertical tangent screw drive 26. The telescope is identified by the reference character 23 and is fixedly mounted to the vertical wheel 24. Mounted above the telescope 23 is a highly sensitive rotating inductor coil 27 which is mounted on a mounting plate 28 by means of brackets 29 fastened to the telescope 23. The inductor coil 27 is turnably mounted in tension-loaded bearings for extremely close tolerance so that the axis of the rotating inductor coil 27 is always maintained in a fixed alignment with the telescope 23. The bearings for the inductor coil 27 may be mounted in a saddle frame 30 which is mounted on top of the mounting plate 28. The inductor coil 27 may be driven by any suitable drive indicated by the reference character 31. In practice, the drive may be a clock-spring arrangement having a winding key 32. Preferably the drive is of non-magnetic material and a rubber torque drive may be used instead of the non-magnetic spring drive. All of the parts of the theodolite 10 are of non-magnetic material.

Mounted on each end of the coil are slip-rings 33 against which spring fingers 34 engage for making electrical connection with the windings of the inductor coil 27. Wires 35 and 36 are connected, respectively, to the spring fingers 34 to electrically connect the inductor coil 27 to the null amplifier or microvoltmeter network shown in FIGURE 3 of the drawings. The windings of the inductor coil 27 are wound around a polyiron core 37. The winding comprises many turns of wire having inductive reactance in excess of 200 henrys. The polyiron core 37 enables the inductive reactance to be increased and still maintain the relative small size required in inductor coil 27. In addition, the polyiron core 37 does not retain magnetism but is effective to increase the inductive reactance of the inductor coil 27.

The housing for the electrical circuit shown in FIGURE 3 is identified by the reference character 38 and is fastened to one of the legs 11. The housing 38 is of a plastic material so as to be non-magnetic and is always fastened to the same leg 11. The instrument 10 is always set up so the leg 11 containing the housing 38 is facing in the same direction. The slightest change in setting up the instrument 10 may throw that particular reading way off.

The null amplifier or electronic microvoltmeter is shown diagrammatically in FIGURE 3 of the drawing and comprises generally a tone generator including a tube 40, a balanced push-pull amplifier including a tube 41, an audio amplifier including a tube 42, a resonant output push-pull transformer 43, an earphone 44, and a series of batteries indicated by the reference character 45.

The tube 40 of the tone generator comprises a filament 53, a diode 54, a suppressor grid 55, a screen grid 56, a control grid 57, and a plate 58. The diode 54 is connected to ground and the suppressor grid 55 is connected to one side of the filament and from there both are connected to ground. The other side of the filament is connected to the terminal A plus of the one and one-half volt dry cell through a switch 48. The screen grid 56 is connected to the plate 58 and both are energized from the B plus terminal of the 67½ volt dry cell through a plate isolating resistor 65. Also connected in series with the plate isolating resistor 65 is a filter resistor 66. Associated with the filter resistor 66 is a filter capacitor 67. The purpose of the filter resistor 66 and the filter capacitor 67 is to prevent tone from reaching the tubes 41 and 42 which are also connected to the B plus terminal of the 67½ volt dry cell. The control grid 57 of the tube 40 is connected to a time constant capacitor 59 and a time constant resistor 60, both of which are connected to ground. The control grid 57 is also connected to a resonant coil 68 and a resonant capacitor 61. The capacitors 59 and 61 constitute the resonant circuit in conjunction with the choke 68. The frequency of the tone generator is effected primarily by the capacitors 59 and 61 and the resonant choke 68. The capacitor 61 is connected to ground. The plate 58 of the tube 40 is connected to a feed-back circuit comprising capacitor 62, phase correcting resistor 63, and a feed-back control resistor 64. This feed-back circuit gives a relatively pure sine wave. Any other suitable tone generator may be used for this invention but I find that the present circuit as described gives practical results and further the tone comprises substantially a pure sine wave. It is preferable that the frequency of the tone generator be in the neighborhood of 800 to 1000 cycles which is suitable for the earphones 44.

The plate of the tube 40 is connected to a load network capacitor 72 and a load network resistor 73 through a tone coupling resistor 71. The load network capacitor 72 and resistor 73 are connected to ground. One function of the load network capacitor and resistor is to maintain a stable load on the output of the oscillator and this gives a substantially constant input to the tube 41 of the balancing push-pull amplifier.

The tube 41 comprises a filament 74, a plate 77, a plate 78, a grid 79 and a grid 80. The filament 74, the plate 77 and the grid 79 constitute a triode arrangement and the filament 74, the plate 78 and the grid 80 constitute another triode arrangement. Both ends of the filament 74 are energized from the A plus terminal of the one and one-half volt dry cell through the switch 48 and a filament resistor 75. The center portion of the filament is connected to ground through a conductor 76. The oscillations from the tone generator 40 are supplied to the grids 79 and 80 of the tube 41 respectively through coupling capacitors 81 and 82. The grid 79 is connected to the C terminal of a negative 3 volts on the 4½ volt dry cell through an isolating resistor 83 and conductor 90. The purpose of the isolating resistor 83 is to prevent the tone from being fed back into the 4½ volt dry cell. The grid 80 of the tube 41 is connected to one side 35 of the winding of the spinning coil through an isolating resistor 84 and a conductor 86. The conductor 86 has a filter capacity 85 to by-pass any spurious high frequency inductive pick-up from the winding of the spinning coil. In other words, the filter capacitor 85 filters to the ground any inductive voltage having a higher frequency than the spinning coil. The other side 36 of the winding of the spinning coil is connected to a grid-bias by-pass capacitor 87 and to a grid-bias control resistor 88 so as to adjustably vary the bias on the grid 80 with respect to the fixed bias 79. The lower end of the resistor 88 is connected to the negative 4½ volt terminal C of the 4½ volt dry cell through the switch 46. The grid bias control 88 is also connected to a vernier bias control resistor 89 so that the balancing of the excitation of the grids 80 and 79 may be adjusted so that the output of the plates 77 and 78 are identical, giving a balanced circuit. The plate 77 of the tube 41 is connected to one end of a primary 96 of the resonant output pushpull transformer 43. The plate 78 is connected to the opposite end of the primary winding 96. Connected across the plates 77 and 78 is an output tone resonator in the form of an adjustable capacitor 91. The purpose of the output tone resonator is to eliminate any harmonics from appearing in the secondary winding 97 of the transformer 43 and compensates for any non-uniformity existing between either half of the primary transformer and the two triode elements of the tube 41. The center tap of the transformer 96 is connected to the B positive on the 67½ volt dry cell through an adjustable resistor 92 which is by-passed to ground through a capacitor 93. The purpose of the adjustable resistor 92 is to adjust the two triodes to their most sensitive potential. The purpose of the capacitor 93 is to hold the voltage across the resistor 92 relatively constant.

The tube 42 comprises a filament 100, a triode 101, a suppressor grid 102, a screen grid 103, a control grid 104, and a plate 105. The suppressor grid is connected to one side of the filament and they both are connected to ground. The other side of the filament 101 is connected to the A positive terminal of the one and one-half volt dry cell through the switch 48. The screen grid 103 is connected to the plate 105 through a resonating output choke 108. The screen grid 103 is also by-passed to ground through a filter capacitor 109. The screen grid 103 is also connected to the B positive terminal of the 67½ volt dry cell through the switch 47. The secondary 97 of the transformer has one end connected to the negative one and one-half volt C terminal of the 4½ volt dry cell and the other end of the secondary winding 97 is connected to the control grid 104 through a high frequency isolating resistor 106 for eliminating frequencies which are harmonics of the tone generator. The capacitor 107 connects the control grid 104 to ground and further aids in eliminating the higher harmonics of the tone generator to ground thereby impressing on the control grid 104 a higher ratio of fundamental frequencies. The plate 105 is connected to earphones 44 through two capacitors 110 and 111. The capacitor 110 is resonant across the choke 108 and condenser 110 is a coupling capacity of the earphone 44. The choke coil 108 and two capacitors 110 and 111 also discriminates against harmonics and frequencies other than that produced by the tone generator so that substantially the fundamental is impressed upon the earphones. The balanced push-pull amplifier is arranged such that when there is no voltage in the spinning coil the earphones will produce no tone thereby producing what is generally referred to as a "null." The voltage in the spinning coil may be either produced by the rotation of the spinning coil through the earth's magnetic lines of force or by a low frequency electromagnetic wave passing as an excursion through the iron coil of the stationary coil.

The circuit diagram shown in FIGURE 3 shows a direct current amplifier that may be used for low frequency alternating currents not exceeding ten cycles per second. This amplifier is normally used for measurement of microvoltages having slow alternations, such for example, as from the spinning coil 27.

These very low frequency waves are too slow to be measured practically by alternating current amplifier means, as they cannot be indicated or amplified with normal components.

To afford a means of amplifying and reproducing without introducing spurious noise, such as with a mechanical chopper, the tone generator 40 is used as an electronic input cycling means to the balanced amplifier 41 through the capacitors 81 and 82. This cycling or half-wave chopping permits the bias cut-off point to be set at a sensitive portion of the amplifier tubes transfer characteristics without desensitizing the amplifier to weak voltage changes from the coil 27. In addition, this cycling or half-wave chopping produces the balance and tone for indication purposes that is reproduced to the earphones through the amplifier 42.

Figure 4:
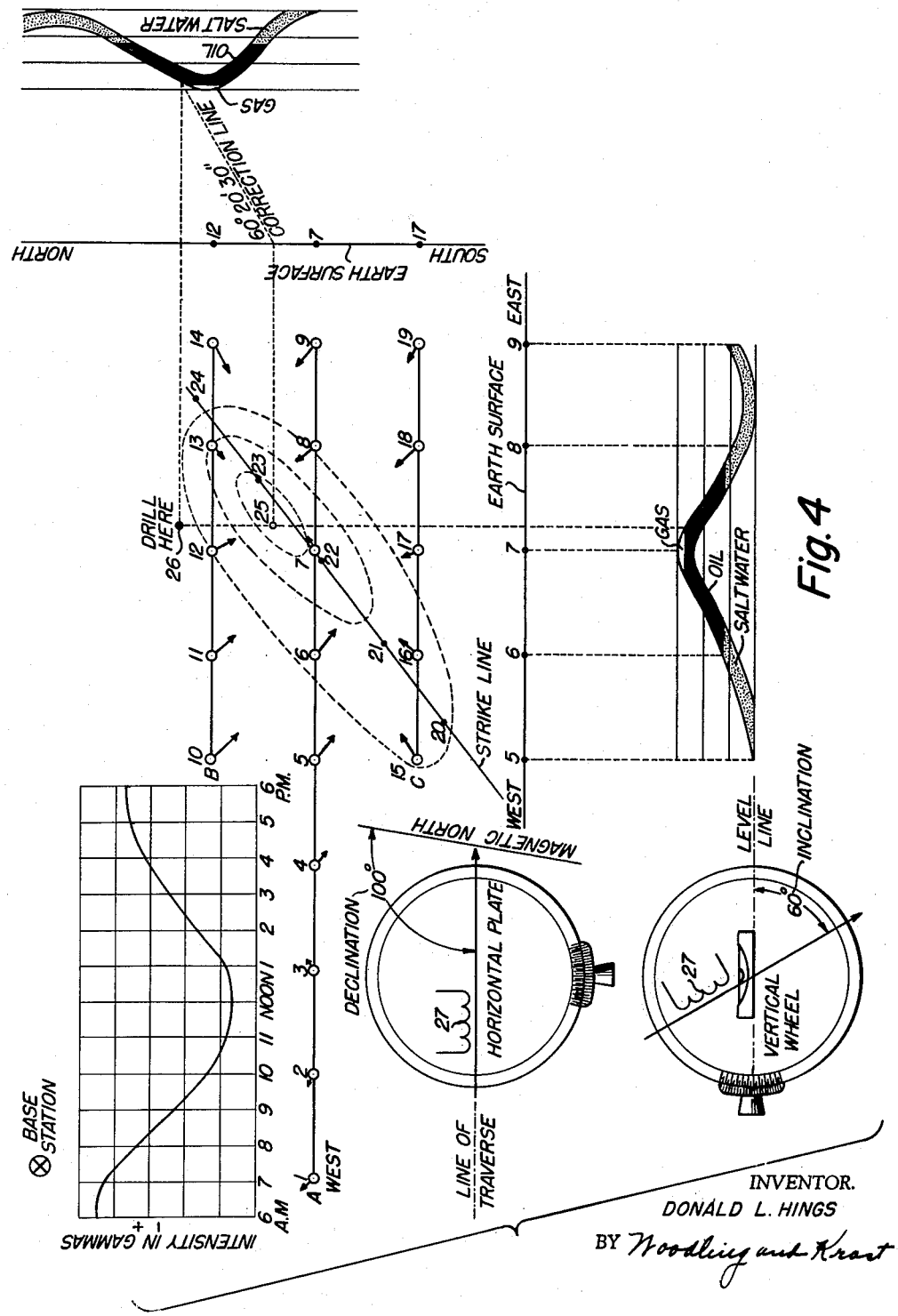
FIGURE 4 is a survey of an area of the earth's surface showing the pattern of an example survey of a substrata formation.

With reference to FIGURE 4 of the drawings, I illustrate a typical example of a survey made in accordance with the method of the invention. My instrument and method of measurement indicates changes in the earth's structure primarily caused by variations in the lower strata rock magnetic susceptibility. The example shown in FIGURE 4 will be described with reference to discovering changes in substrata formations.

In starting the survey, the operator first makes a traverse which may be identified by the line A in FIGURE 4, preferably in a west-east direction. In this example, the operator begins at Station No. 1 shown on the left-hand side of FIGURE 4. At Station No. 1, the operator sets up the theodolite inductor coil 10 and establishes a zero reference both on the horizontal verniers 19 and the vertical verniers 20 with respect to the traverse line A. From previous information obtained from available technical charts, the operator knows approximately the horizontal declination and vertical inclination with respect to true magnetic north within a tolerance of substantially one degree. For Station No. 1, the angle between the traverse line A and true magnetic north is approximately 99 degrees and this is shown on diagrammatic illustration of the horizontal plate being a part of FIGURE 4 of the drawing. The vertical inclination at Station No. 1 is approximately 60 degrees as shown by the diagrammatic illustration of the vertical wheel in FIGURE 4. In setting up the instrument and in taking readings, the operator performs the following steps:

The operator first levels the instrument 10 by observing the leveling bubbles 16 and 17 and adjusting the adjusting screws 15. As explained before, the leveling bubbles may be observed with an accuracy of plus-or-minus five seconds in angular measurement. The operator next establishes the traverse line as a zero reference indicated by the line A of FIGURE 4, preferably in a west-east direction.

The next operation of the operator is to swing the telescope 23 to a starting position approximately the same as that shown by the horizontal plate and by the vertical wheel in FIGURE 4. The fourth step is for the operator to close the switches 46, 47 and 48 of the electrical circuit. These switches may be all ganged together and operated by one movement of a master switch. At the same time the operator places the earphones 44 on his head and adjusts the potentiometer 88 and the rheostat 92 to approximately null with the inductor coil 27 remaining stationary. As part of the fourth step, he makes a final adjustment of the null by operating the vernier rheostat 89 with the coil standing still. The fifth step is to start the rotation of the inductor coil 27 by moving the release lever 21. The coil is driven at a substantially constant speed and preferably within a range of 100 to 200 r.p.m. The rotation of the inductor coil 27 destroys the null previously established by the setting of the vernier rheostat 89. The operator then re-establishes the null by readjusting both the horizontal vernier 19 and the vertical vernier 20 of the theodolite head 10. When the new null is established, he then notes the reading of the horizontal and vertical verniers 19 and 20 and these readings establish the horizontal declination and vertical inclination values for Station No. 1. The axis of the coil 27 now is precisely in the same direction as the lines of the earth's magnetic field at Station No. 1.

This completes the operations at Station No. 1 and the operator then moves the equipment to Station No. 2 which may be approximately a mile from Station No. 1 along the traverse A. Corrections for location changes should be made every 1000 feet.

The earth has north and south geographical poles. The earth has north and south magnetic poles.

The declination for any specified location on the earth's surface is the angle between two lines meeting at said specified location and pointing respectively to the geographical pole and to the related magnetic pole.

The inclination for any specific location on the earth's surface is the angle between two lines with one of said lines being horizontal as determined by a bubble level at said location and with the other line being parallel to said first line in the vicinity of the equator and gradually decreasing to a substantially ninety degree dip at the magnetic poles.

When the coil reads "null" for horizontal declination it means that the axis about which the coil is rotating is pointing to the magnetic north pole. The null is not complete until the axis is also pointing on the inclination line.

At Station No. 2, the operator follows the same procedure as outlined for Station No. 1, hereinabove described and notes the horizontal declination and vertical inclination readings for Station No. 2. At the time the operator makes these readings at the respective stations, he notes the exact time of day. The remaining Stations Nos. 3 to 9 are made in the same manner as previously described for Stations Nos. 1 and 2 with the operator noting the horizontal declinations and vertical inclinations and the specific time for each station. The operator can make the respective observations at each station at approximately twenty minute intervals.

After obtaining the information with respect to traverse A, the operator then makes a series of evaluations from this information. The following figures for vertical inclinations and horizontal declinations along the traverse line A in FIGURE 4 are shown below. The vertical inclinations and horizontal declinations are made in degrees, minutes and seconds. The reading 60-20-20 for Station No. 1 for the inclination would mean 60 degrees, 20 minutes and 20 seconds:

TRAVERSE A FOR INCLINATION READINGS

| Station No. | Time | Inclination | Inclination Normal | Inclination Deviation |
|---|---|---|---|---|
| 1 | A | 60-20-20 | 60-20-26 | Plus 6 Seconds. |
| 2 | B | 60-20-24 | 60-20-26 | Plus 2 Seconds. |
| 3 | C | 60-20-20 | 60-20-26 | Plus 6 Seconds. |
| 4 | D | 60-20-40 | 60-20-26 | Minus 14 Seconds. |
| 5 | E | 60-21-00 | 60-20-26 | Minus 34 Seconds. |
| 6 | F | 60-20-40 | 60-20-26 | Minus 14 Seconds. |
| 7 | G | 60-20-10 | 60-20-26 | Plus 16 Seconds. |
| 8 | H | 60-20-00 | 60-20-26 | Plus 26 Seconds. |
| 9 | I | 60-20-20 | 60-20-26 | Plus 6 Seconds. |

TRAVERSE A FOR DECLINATION READINGS

| Station No. | Time | Declination | Declination Normal | Declination Deviation |
|---|---|---|---|---|
| 1 | A | 100-00-00 | 99-59-00 | Minus 1 minute 0 Seconds. |
| 2 | B | 99-59-00 | 99-58-00 | Minus 1 minute 0 Seconds. |
| 3 | C | 99-58-00 | 99-58-20 | Plus 0 minute 20 Seconds. |
| 4 | D | 99-57-00 | 99-58-00 | Plus 1 minute 00 Seconds. |
| 5 | E | 99-56-00 | 99-58-40 | Plus 2 minutes 40 Seconds. |
| 6 | F | 99-55-00 | 99-57-20 | Plus 2 minutes 20 Seconds. |
| 7 | G | 99-54-00 | 99-55-00 | Plus 1 minute 00 Seconds. |
| 8 | H | 99-53-00 | 99-52-00 | Plus 1 minute 00 Seconds. |
| 9 | I | 99-52-00 | 99-49-00 | Minus 3 minutes 00 Seconds. |

With reference to the inclination readings, the operator establishes from these readings an average value for the individual stations which is identified in the chart as inclination normal. In other words, the inclination normal or mean values for the individual stations on traverse A are 60 degrees, 20 minutes and 26 seconds. The difference between the inclination normal and the actual inclination readings for each station gives the inclination deviation for the individual stations. The same procedure is followed in determining the declination deviations for the declination readings, provision being made for traveling west-to-east on the traverse A. The operator then takes the inclination deviations and the declination deviations for each station and plots them as shown in FIGURE 4, the individual vectors being determined by the values of the inclination deviations and the declination deviations. The declination deviations are shown on the "X" axis and the inclination deviations are shown on the "Y" axis and the same signs are employed as in ordinary plotting of graphs. The plotting of these inclination and declination deviations gives a set of vectors as shown on the traverse line A in FIGURE 4.

It is to be noted that the vectors at the Stations 4, 5 and 6, beginning at Station No. 4, gradually increase in magnitude and their angles lie in the fourth quadrant. At Station No. 7, the vector swings in the direction of the first quadrant and is of a low magnitude. The vector at Stations Nos. 8 and 9 resides in the second quadrant and has an increased magnitude over that of Station No. 7. This reversal in the direction of the vectors establishes an inclination anomaly and indicates to the operator changes in the earth's structure primarily caused by variations in the lower strata rock magnetic susceptibility in the vicinity of Station 7.

The vectors at Stations Nos. 1, 2 and 3 are small random vectors and do not indicate any abnormal change in substrata structure. Having observed that Station No. 7 indicates a change in the substrata structure, the operator then concentrates on this area and runs a B traverse above the A traverse and a C traverse below the A traverse. The traverses B and C are run in the same manner as that previously described for traverse A, and the plotting of the inclination deviations and declination deviation vectors is the same as previously described. No charts or figures are given for these vectors on the traverses B and C, but the vectors are shown to illustrate the results of the survey.

After the vectors are plotted for the three traverses A, B and C, analysis is made of their magnitude and direction and from this the operator may draw in pattern lines, such as illustrated by the elliptical dash lines. It is the combination of all the vectors that creates the pattern of the elliptical dash lines. From the pattern dash lines, the operator draws a strike line which extends substantially through the center or major axis of the pattern lines and shows the strike for the substrata formation. A strike, in geological terms, is an imaginary line formed by the intersection of a bedding plane, fault or any geological structure with a horizontal plane. In an actual survey, many other traverses would be run besides B and C, and the entire localized area would be surveyed with a large number of station readings. However, in the FIGURE 4, a small number have been given to illustrate the principle of the survey.

After the strike line is established, the operator then makes new station readings at Stations Nos. 20, 21, 22, 23 and 24, along the strike line. The readings taken at Stations Nos. 20 to 24 are to determine the presence of an inclination anomaly and whether or not the substrata formation actually contains oil-bearing shale therein.

In the upper left-hand corner of FIGURE 4, there is shown a location identified as a base station. At the base station, diurnal readings are being continuously recorded in accordance with usual and established practice.

Located near the base station as shown in FIGURE 4 of the drawings is a typical diurnal chart, reading from 6 a.m. to 6 p.m. This chart shows the normal diurnal changes which occur during the twelve hour period and is primarily used to inform the operator when magnetic storms occur which will greatly affect the readings taken at Stations 20 through 24. Readings are preferably made under gradually changing diurnal intensities and not during magnetic storms. The readings which are to be taken on the strike line for Stations Nos. 20 to 24 are made preferably from 1:00 p.m. to 4:20 p.m. which is the greatest gradual change in diurnal intensity as shown in the chart in FIGURE 4. Two sets of readings are taken:

READINGS TAKEN DURING CHANGES IN DIURNAL INTENSITIES

*First Set of Readings*

| Station No. | Time, p.m. | Inclination | Declination |
|---|---|---|---|
| 20 | 1:00 | 60-20-20 | 100-10-00 |
| 21 | 1:20 | 60-20-10 | 100-9-40 |
| 22 | 1:40 | 60-20-20 | 100-9-00 |
| 23 | 2:00 | 60-20-10 | 100-8-20 |
| 24 | 2:20 | 60-20-40 | 100-7-40 |

*Second Set of Readings*

| | Time, p.m. | Inclination | Declination | Inclination Difference | Declination Difference |
|---|---|---|---|---|---|
| 20 | 3:00 | 60-23-30 | 100-10-40 | 3'10'' | 40'' |
| 21 | 3:20 | 60-24-30 | 100-10-10 | 4'20'' | 30'' |
| 22 | 3:40 | 60-26-40 | 100-10-00 | 6'20'' | 60'' |
| 23 | 4:00 | 60-25-40 | 100-9-00 | 5'30'' | 40'' |
| 24 | 4:20 | 60-22-00 | 100-8-00 | 1'20'' | 20'' |

The operator starts at Station No. 20 at 1:00 p.m. and takes the inclination and declination readings and then proceeds to Stations Nos. 21, 22, 23, and 24, making readings at the respective stations at 20-minute intervals. He then returns to Station No. 20 and takes a second set of readings, beginning at 3:00 p.m. and finishes at Station No. 24 at 4:20 p.m. It is noted that the interval between the first set of readings at Station No. 20 and the second set of readings at Station No. 20 is an interval of two hours. This holds true for the first and second set of readings, respectively, at the other stations. It is to be observed that the inclination difference between the 3:00 p.m. reading and the 1:00 p.m. reading at Station No. 20 is 3 minutes, 10 seconds, and the declination difference is 40 seconds. It is to be observed that the inclination difference at Station No. 22 between the 3:40 p.m. reading and the 1:40 p.m. reading is 6 minutes, 20 seconds with the declination difference being 60 seconds. The inclination differences are the significant figures for evaluating the presence of oil-bearing shale in the substrata formation. If a similar set of readings were taken where there is no oil-bearing shale in the substrata, the inclination differences would be, at the most, less than one minute where the diurnal changes are normal; that is free from magnetic storms caused by explosions on the sun's surface. It is noted that in the diurnal chart, the slope from 1:00 p.m. to 4:00 p.m. is substantially uniform, indicating that the intensity changes throughout this time have been gradual without any abrupt variations caused by magnetic storms. When the diurnal change is normal, indicating that the magnetic intensities are normal, the difference between sets of readings taken any place other than over an oil-bearing substrata is usually less than one minute. However, as shown in the example tables of FIGURE 4, the difference along the strike line at Stations Nos. 20 to 24 are much larger than the one-minute difference and this indicates the presence of oil-bearing substrata. This difference establishes an inclination anomaly.

An inclination anomaly is a departure from the normal values at a plurality of spaced locations of the inclinations as derived from differences at respective locations between separate sets of inclination values under varying diurnal intensity conditions. Normal values for variations of inclinations are those which may vary through a range not substantially exceeding one minute from zero under average quiet diurnal intensity conditions.

The inclination anomaly may be explained as follows:

It is well known in the oil drilling art that a salt water sand strata contacting an oil permeable strata produces a spontaneous potential which is normally measured in electric logging of drill holes. This self-potential, or spontaneous potential, exists at all oil fields and the highest potential voltage exists at the contact of the salt water and oil across the strata. This potential forms lines of force above and below the oil formation originating from the salt water strata. The oil field itself functions as an electric cell and is constantly circulating current around the oil strata, in accordance with the size and depth of the oil strata. The oil which acts as an insulator maintains the potential by its relatively high resistance. The neighboring substrata and non-oil bearing formations beyond the oil trap passes the current around the field.

These currents create an electromagnetic field, which remains substantially constant in the area of the oil-bearing substrata. This electromagnetic field created by the currents of spontaneous potential in combination with the changing intensities of the earth's magnetic field caused by the diurnal changes makes a resultant shift in the direction of the earth's magnetic field as measured above the oil-bearing substrata. This accounts for the fact that the inclination differences between the readings at the respective Stations Nos. 20 to 24 at two hour intervals are greater than the readings taken at similar intervals at a location where there is no oil bearing substrata formation therebeneath.

Preferably, the area where the greatest inclination differences occur is selected as representing the place of the image well, indicated by the No. 25. The real well indicated by the No. 26 is to the north of the image well. With specific reference to FIGURE 4 of the drawings, it is noted that the north-south surface line shows the 60°20′30″ angle correction, which is the amount of inclination at this particular area. The oil bearing substrata is then projected northward and the oil well will actually be drilled on the spot marked No. 26 "Drill here" in FIGURE 4. Thus it will be noted that the apparent location of the oil formation is always magnetically north of the survey indications proportional to the angle and depth. It may also be noted that the apparent shape may alter in reference to the north and south slopes of the formation due to this angle of projection.

The determination of depth is roughly indicated by the length of the minor axis across the pattern. A minor axis line drawn approximately through Station No. 7 and approximately perpendicular to the strike line would give the operator a good indication of the depth he would have to drill before hitting oil.

It should be noted in FIGURE 4 that the formation shown is a typical trapped oil formation in an anticline that is upheld under pressure by the salt water. This doming may be caused by salt or coral reef formations with limestone intrusions. The strata that is indicated in FIGURE 4 is the porous strata existing between relatively non-porous strata. It is not usually considered good practice to drill in the center of the formation due to the existence of the gas gap as shown in FIGURE 4.

My instrument may also be used to determine the presence of oil lying loosely in sand fields—for instance, Cretaceous sands. In a field of this type, there are no strata formations present in which the oil may collect. The oil found in these sands probably migrated up through the porous strata from an oil bearing strata that did not have a sufficient trap rock to contain the oil therein or migrated laterally from another oil field miles away. The salt water always found in oil bearing strata formations and essential in producing a spontaneous potential, is also found associated with the oil lying loosely in sand fields. The spontaneous potential set up in an oil bearing sand field is not as strong as set up in strata formations, but my instrument can measure this small change. The shallower sand formation produces relatively weaker results, but in the absence of formation changes closer tolerances may be maintained, and the contrast in the vectors is relatively good and equal to strata formation readings. One phenomenon is consistent in both sand and formation results and that is that a sharp reversal in the deviation along the line of traverse indicates the center point of production. It is usually the case that where oil is present in sand fields that the vertical differences would be at the most three minutes whereas in oil bearing strata formations, the vertical differences may be as much as ten minutes as hereinabove described.

The amount of oil contained in an oil bearing shale or the relative cubic volume of the production zone may also be determined by my instrument. The larger the vertical differences, the more productive a field will be. This is due to the greater amount of salt water found in contact with the larger oil body thus setting up a larger spontaneous potential.

The declination also varies in the vicinity of oil strata, but the variations are considerably obscured by other declination variations caused by telluric currents moving over the earth's surface.

These telluric currents respond strongly to diurnal changes and therefore produce local magnetic deviations that are difficult to separate from other east-west declination variations.

This invention discriminates by detecting the relatively stable inclination variations that require greater diurnal magnetic intensity changes to influence them, except under conditions where an oil strata exists. The discrimination between oil substrata deviations of the declination and telluric currents is obtained by the horizontal east-west anomalies which will persist through the random telluric current variations.

My instrument and method will determine changes in formation of the earth's substrata and also determine if there is oil bearing rock in these formations, how deep the oil is, the relative cubic volume of the production zone and the lateral boundaries of the production zone.

The description with reference to FIGURES 1–4 discloses a very simple and inexpensive device and method for determining the presence of substrata formations and, further, whether or not the formation is of an oil-bearing substrata. The FIGURES 5 and 6 show a complete electronic system which is automatic in operation and is based upon the same general principles as disclosed in the previous figures.

FIGURE 5 shows the arrangement at a specified station and comprises essentially two theodolite units electrically connected to a recorder. The theodolites in FIGURE 5 are substantially identical to those shown in the previous figures except that there is no need for the telescope.

In FIGURE 5 the two modified theodolites are identified by the reference characters 10A and 10B. While only the vertical scale is shown in FIGURE 5, it is to be understood that the theodolite includes the horizontal scale as well as the other parts. The recorder in FIGURE 5 is indicated by the reference character 130 and may comprise a two-channel recorder employing either a microvoltmeter or a galvanometer system. Recorders of this type are now available on the market and include as many as 36-channel systems.

The inductor coil 27 may be driven by the drive 31 as shown in FIGURE 2 of the drawings. Each of the units as shown in FIGURE 5 may be placed at respective stations over an area to be investigated. In the event the locations of the units are accessible, they may be carried there by ground vehicles, such as trucks; however, if the locations are inaccessible, the units may be carried there by the use of helicopter service. A survey may comprise the placing of a dozen or more of these units of FIGURE 5 in areas that are to be investigated.

At each station, the procedure of setting up the equipment is substantially as follows: The operator first plugs in the electrical plug 121 in the jack 120A on the left-hand unit and thereby connects the amplifier circuit of FIGURE 3 to the theodolite. Next, the operator first levels the theodolite in a horizontal plane by the use of the leveling bubbles 16 and 17. The next step is to determine the null axis both for the declination on the horizontal scale and the inclination on the vertical scale by rotation of the coil. The setting for the horizontal scale remains fixed but the setting for the inclination is moved off "null" in a clockwise direction about five or more minutes.

The operator next adjusts the other theodolite device in the same manner by electrically connecting the electrical plug 121 in the jack 120B. After the null axis is determined on both the declination on the horizontal scale and the inclination on the vertical scale, and the horizontal setting is fixed but the inclination setting is moved off the "null" in a counterclockwise direction about five or more minutes. The final adjustment to be made on both of the theodolite devices is to stop the rotation of the coil and lock it in place, to a setting whereby the two coils will be influenced the least by changes of the declination, which means that the two stationary coils generate substantially null voltage so far as declination changes are concerned.

With respect to inclination changes, the voltage generated in the inductor coil in the theodolite device 10A will oppose the voltage generated in the coil for the theodolite device 10B. Accordingly, the system is highly responsive to inclination changes of the magnetic lines of force. The two-channel recorder 130 will record the voltages generated incident to changes in inclination of the magnetic field.

The recorder of the type herein preferred for use is of the type which has a drive which continuously moves the recording paper. The recorder has other provisions whereby it will take sample readings at specified intervals of time determined by the setting of the device. Therefore throughout the course of the analysis, the recorder will periodically take recorded readings at specified times indicating the inclination variations resulting from changes in the earth's magnetic field.

At the end of the survey for a number of stations, the operator analyzes the readings at the respective stations and thereby notes which of the stations had the largest inclination readings and these are likely to be the ones where the oil-bearing substrata is present. The readings vary throughout the course of the day from the initial setting because of the diurnal magnetic intensity changes. These diurnal magnetic intensity changes do not necessarily appreciably change the recorded readings at the respective stations if there is no oil-bearing substrata present. In other words, when the device of FIGURE 5 is placed over an oil-bearing substrata and with changes in magnetic intensity, the recorder will manifest differential voltage readings by chart record comparisons, and the greater the differential readings, as a rule, the more likely is this point to be the center of an anomaly indicating the presence of an oil-bearing substrata zone. The differential voltage readings may be calibrated into angular inclination values such as minutes and seconds. Differential values greater than one minute establish an inclination anomaly and indicates the presence of an oil-bearing substrata.

Interpretation of the recorded values are determined by reference to a master recording of the diurnal magnetic intensities relating equal periods of the sampling records with those of the diurnal records. The relative inclination variations are represented by the differential between the two channels of the records. The recording paper is calibrated to form a predetermined setting established in setting the coils to a null point or dip in the recorded voltage equal to the "off-set" of inclination variation either plus-or-minus depending on which record it appears. The off-set angles may be in the neighborhood of five minutes or more.

In making the survey, it is preferable to set and adjust the coils and recorder at each respective station during the quiet hours, preferably in the morning, when the rate of change of the vertical diurnal intensities are at a minimum. One reason why the devices should be set during the quiet hours (preferably in the early morning) is that the devices then are least activated and produce a constant reading, and thus at later periods throughout the day, when the diurnal changes are more disturbed, the devices will give a greater difference in reading between those taken in the morning and those taken at the disturbed times.

In FIGURE 6 I show an extended system which is completely electronic and automatically controlled with a centralized 36-channel recorder indicated by the reference character 140. The description with reference to FIGURE 6 will be described with respect to the localized area for investigation shown in FIGURE 4. In this example, there is located at each of the Stations Nos. 10–19, an instrument as shown in FIGURE 5, without the recorder 130. Wires are respectively connected from the Stations Nos. 10–14 to a junction box 142. Similarly, wires from Stations Nos. 5–9 are connected to a junction box 143 and wires from Stations Nos. 15–19 are connected to a junction box 144. A multiconductor cable 156 connects the three junction boxes 142, 143 and 144 to a master junction box 145.

From the master junction box 145, individual wires for the respective stations are connected to the 36-channel recorder. In FIGURE 6, however, only 18 channels are used but for a larger survey, all of the channels may be employed.

Each of the devices at the respective stations are set up as described with reference to FIGURE 5, except that now they are all connected to the centralized 36-channel recorder 140. The cable may be several miles long and is preferably shielded so that the cables do no pick up any influences from spurious currents. In some localities it may be necessary to pre-amplify the voltage from the coil in order to compensate for the loss which may occur in the cables.

The 36 channel recorder is provided with a manual switch or button 152 which may be depressed for taking sample test readings of all the stations on the recorder to make certain that each of the stations has been properly set up. After it is determined that all the stations are properly working, then the 36-channel recorder is governed automatically by a diurnal magnetic gradient detector and trigger switch indicated by the reference character 141. Wires 153 interconnect the recorder 140 and the diurnal gradient detector and trigger switch 141.

The diurnal gradient detector and trigger switch device is of the type which may be variably set or adjusted so that it will trigger the 36-channel recorder into operation at the instant that the slope of the vertical magnetic intensity change equals that pre-set on the dial of the gradient detector. The diurnal gradient detector and trigger switch device 141 is responsive to the vertical diurnal magnetic changes and these changes are recorded on one of the channels of the 36-channel recorder through the connection of the wire 154. In other words, throughout the course of the survey, one of the channels of the 36-channel recorder shows the continuous vertical diurnal magnetic changes. If the diurnal changes appear to be of the gradual type, then the setting for the trigger operation of the switch is on a relatively slow slope so that there will be an opportunity to get several readings throughout the course of the survey. The speed of the paper is set to match the general slope of the vertical diurnal changes.

On a day in which the vertical diurnal magnetic intensities are quite abrupt, the setting of the diurnal gradient dial is for a greater slope and the speed of the paper is accordingly stepped up. When the slope of the vertical diurnal changes is quite steep, the magnitude of the inclinations are quite large, assuming, of course, that the respective devices for the stations are placed over oil-bearing substrata. A station which manifests the largest difference in reading between the initial setting when the diurnal changes are quiet (preferably in the morning) to those taken later in the day indicates an inclination anomaly and the center of the oil-bearing substrata zone. The automatic diurnal magnetic gradient selector may be either manually pre-set or may be set to adjust itself to any gradient over a predetermined speed. This is based on the slope of the gradient maintaining a relatively constant angle for periods not shorter than five seconds.

The gradient detector samples a voltage change that sets the gradient angle against time. This time-voltage sets the delay period for the recording time and speed. The recording paper is calibrated in minutes and the differential readings from pairs of coils indicate the variations of inclination during the changes in the diurnal magnetic intensities. Since the setting of the gradient angle is equal to the speed of the recording paper, the differential readings have a relatively constant calibration. Thus a steep diurnal slope may be made to give a differential reading of about the same values as for a gradual slope and vice versa. The differential may be calibrated in angular inclinations of minutes and seconds. Readings of more than one minute indicate the presence of oil-bearing substrata.

A reference chart may be referred to wherein the relative slopes can be brought to a common value thereby indicating the proportions of variation in the remote readings to indicate a relative value of oil-producing formation. From this observation, the amount of production of the oil-bearing substrata can be readily determined.

The station which manifests the largest difference in reading of inclinations is activated by the oil-bearing substrata. The diurnal gradient detector and trigger switch has a rectifier arrangement so that only the positive slopes, for example, do the triggering, and the negative slopes are discriminated against and ineffective to operate the trigger switch. However, the rectifier may be reversed in its connection so that the negative slope does the triggering instead of the positive.

The method of determining automatically both the angle and the intensity, for recording purposes, is not to be limited to a fixed or static coil arrangement. In practice, agitation or oscillation of either the coil or the magnetic field by a small auxiliary field makes measurement much easier with less sensitive amplifiers. If the earth's field is agitated by a small magnet swing on a pendulum, on a clock mechanism, this produces a varying alternating current voltage and the electric amplitude increases with the field intensity. Or if a coil separated from the measuring coil, with the core axis in line with the earth's field wherein the core of the two coils simulates a transformer, a very small low frequency current in the primary will be influenced along the lines of force of the earth's field, so that it produces a variation in the secondary. This is similar in function to the swinging magnet. This low frequency alternating current wave, which may be from 10 cycles to a fraction of a cycle per second, is relatively easily amplified compared to the wave from the diurnal changes which is practically one cycle per day. This permits the recorder to oscillation, and produce a visual carrier wave and the diurnal changes as the modulation, with maximum modulation of amplitude occurring during the afternoon periods.

This same technique may be applied for directional determination. But, instead of swinging a magnet, it is more accurate to suspend the coil on the fulcrum point of the pendulum, so that the coil axis sweeps magnetically north and south, with the mean angle of the coil at the inclination dip. In this manner a wave form exists only as the coil swings away from zero and the distortion created by this non-linear wave generation indicates any relative change in angle by comparing one end of the pendulum cycle swing to the other end of the pendulum cycle swing as recorded with time. The practical advantage of this system is that voltages in the millivolt range are obtainable instead of microvolts and may be relatively easily recorded with a small amount of equipment. The invention contemplates a coil having means for stimulating measurement by agitation, oscillation, or rotation of the relationship between the earth's magnetic field and the coil, to thereby produce comparable sampling cycles of the earth's field.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Means to determine the presence of salt-water contact with hydrocarbon bearing substrata comprising, angle measuring means to determine respectively the magnetic angles at first and second spaced locations under a first diurnal gradient, first control means responsive to said first diurnal gradient to control said angle measuring means, and second control means responsive to a changed diurnal gradient to control said angle measuring means to determine respectively the change in the magnetic angles at said first and second spaced locations under said changed diurnal gradient, a change in angle at said first location opposite to that at said second location determining the presence of salt-water contact with hydrocarbon bearing substrata between said first and second locations.

2. Means to determine the presence of salt-water contact with hydrocarbon bearing substrata comprising, angle measuring recording means to determine respectively the magnetic angles at first and second spaced locations under a first diurnal gradient, first control means responsive to said first diurnal gradient to control said angle measuring recording means, and second control means responsive to a changed diurnal gradient to control said angle measuring recording means to determine respectively the change in the magnetic angles at said first and second spaced locations under said changed diurnal gradient, a change in angle recorded at said first location opposite to that recorded at said second location determining the presence of salt-water contact with hydrocarbon bearing substrata between said first and second locations.

3. Means to determine the presence of salt-water contact with hydrocarbon bearing substrata comprising, angle measuring means to determine the direction of the resultant magnetic fields of the combination of the earth's magnetic field, the field created by current flow set-up by spontaneous potential generated by a salt-water contact with oil bearing substrata and of the diurnal field, adjustment means on said angle measuring means to determine the direction of said resultant magnetic fields at two spaced locations under a first diurnal gradient, said adjustment means being operable to determine the direction of the resultant magnetic fields at said two spaced locations under a changed diurnal gradient, said adjustment means upon manifesting a change in said direction of the resultant magnetic fields at one of said locations opposite to that at the other location created by a diurnal change determining the presence of salt-water contact with hydrocarbon bearing substrata between the two spaced locations.

4. Means to determine the presence of salt-water contact with hydrocarbon bearing substrata comprising, angle measuring means to determine the inclination angle at first and second spaced locations, adjustment means on said angle measuring means to determine the inclination angle at said two spaced locations under a first diurnal gradient, said adjustment means being operable to determine the inclination angle at said two spaced locations under a changed diurnal gradient, said adjustment means upon manifesting a change in said inclination angle at one of said locations opposite to that at the other location created by a diurnal change determining the presence of salt water contact with hydrocarbon bearing substrata between the two spaced locations.

5. Means to determine the presence of hydrocarbon bearing substrata comprising, angle measuring means to determine the inclination angle respectively at a plurality of spaced locations, adjustment means on said angle measuring means to determine the inclination angle at said respective spaced locations under a first diurnal gradient, said adjustment means being operable to determine another inclination angle at said respective spaced locations under a changed diurnal gradient, said adjustment means upon manifesting changes in said inclination angles respectively at the same locations different from the inclination angles taken under the first diurnal gradient defining an inclination anomaly created by said changed diurnal gradient determining the presence of hydrocarbon bearing substrata.

6. Means to determine the presence of hydrocarbon bearing substrata comprising, angle measuring means to determine the inclination angle respectively at a plurality of spaced locations, adjustment means on said angle measuring means to determine the inclination angle at said respective spaced locations under a first diurnal gradient, said adjustment means being operable to determine another inclination angle at said respective spaced locations under a changed diurnal gradient, said adjustment means upon manifesting changes in said inclination angles respectively at the same locations different from the inclination angles taken under the first diurnal gradient defining an inclination anomaly of a magnitude of at least one minute created by said changed diurnal gradient determining the presence of hydrocarbon bearing substrata.

References Cited in the file of this patent

UNITED STATES PATENTS

| | | |
|---|---|---|
| 2,124,825 | Machts et al. | July 26, 1938 |
| 2,151,627 | Vacquier | Mar. 21, 1939 |
| 2,468,554 | Hull | Apr. 26, 1949 |
| 2,474,693 | Rowe | June 28, 1949 |
| 2,548,571 | Frowe | Feb. 5, 1952 |
| 2,611,803 | Rumbaugh et al. | Sept. 23, 1952 |
| 2,635,134 | Jenny | Apr. 14, 1953 |
| 2,659,859 | Heiland | Nov. 17, 1953 |

OTHER REFERENCES

Heiland: (Text) "Geophysical Exploration," Prentice-Hall Inc., New York, 1940; pages 367–372 relied on.

Beers et al.: Transactions, American Geophysical Union, vol. 28, No. 4, August 1947; pages 545–548.